July 24, 1951                F. TRATZIK                2,562,003
                           LUBRICATED VALVE
                          Filed June 10, 1946
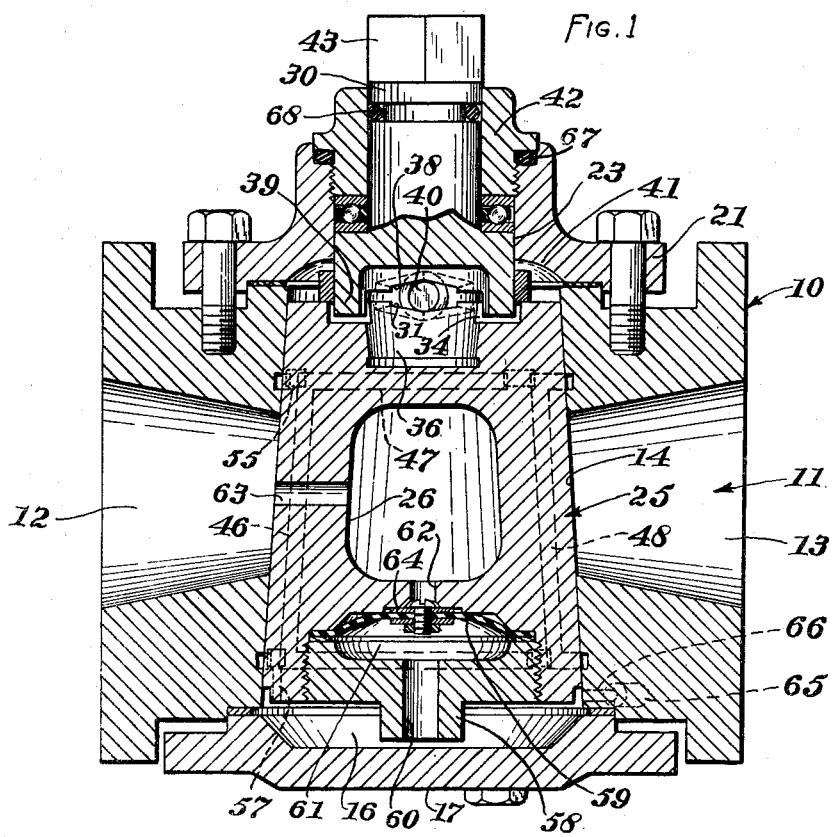
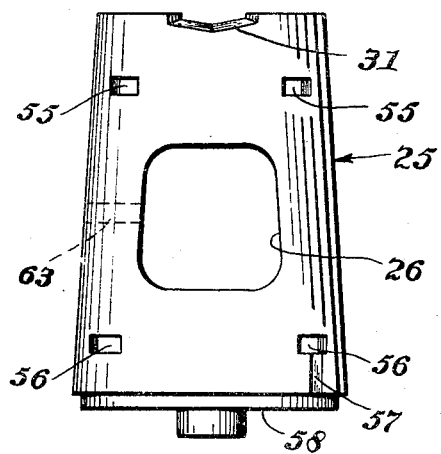
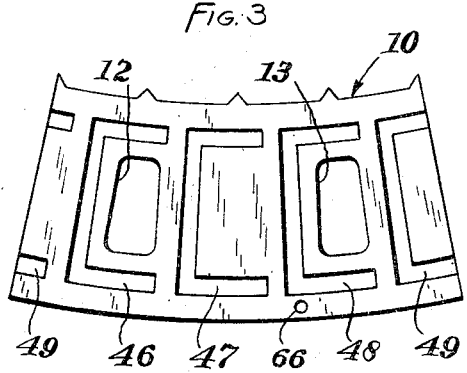
INVENTOR:
FREDERICK TRATZIK,
BY Cushman Darby & Cushman
ATTORNEYS Patented July 24, 1951

2,562,003

UNITED STATES PATENT OFFICE 2,562,003

LUBRICATED VALVE

Frederick Tratzik, Decatur, Ill., assignor to Mueller Co., Decatur, Ill., a corporation of Illinois Application June 10, 1946, Serial No. 675,658

3 Claims. (Cl. 251—93)

The present invention relates to lubricated valves.

Objects of the invention are to provide a valve which includes an arrangement to automatically move lubricant to the seating surfaces, will provide an extremely efficient seal in a flow line under pressure, and which may be readily operated even when used with extremely high line pressures.

Other objects and advantages of the invention will be apparent from the following specification and accompanying drawings wherein:

Figure 1 is an axial section through a valve of the present invention.

Figure 2 is an elevation of a valve plug, and

Figure 3 is a developed view of the valve casing member seating surface.

Referring to Figure 1, the numeral 10 designates the valve casing member which is provided with a flow passageway 11 including an inlet 12 and an outlet 13. A tapered valve seat bore 14 extends transversely of the flow passageway 11, the larger end of the seat bore opening to a chamber 16 which is closed at its outer end by a plate or cap 17 secured in position by means of bolts. A gasket may be provided between the plate 17 and casing member. A stop block, not shown, may extend upwardly from the plate 17 to limit rotation of the valve plug or element through 90°.

The smaller end 20 of the seat bore 14 also extends through the casing member 10 but is closed by a bossed plate 21 secured to the casing by circumferentially spaced bolts. Plate 21 includes a bore 23 of a smaller diameter than the smaller end of the seat bore 14.

A tapered plug or valve member 25 is mounted in the seat bore 14, the plug including a flow port 26. The smaller end of the plug 25 is so formed as to cooperate with a similar structure provided on the inner end of an operating stem 30. This arrangement, which causes the plug or valve element to initially move axially when any rotating force is applied thereto, is described in detail in the application of Walter J. Bowan and Frederick Tratzik, for Valves, Serial No. 611,465, filed August 20, 1945, which matured to Patent No. 2,510,494 on June 6, 1950. For the purpose of the present invention, this operating arrangement may be described as follows: the smaller end of the plug includes a pair of diametrically opposite and concentric concave cam surfaces 31 each of which is of V-shaped form. As shown in Figure 1, the cam surfaces 31 are inclined at an acute angle to a radius of the plug, with their point of greatest depth at the seating surface of the plug.

The cam surfaces 31 extend through an arc of somewhat less than 60° and, at their ends, have shoulders extending upwardly to the flat end surface of the plug. Midway between the cam surfaces 31, that end of the plug is provided with diametrically opposite recesses or pockets 34 which extend radially of the plug. The diametrically opposite cam surfaces 31 and the diametrically opposite recesses 34 are arranged about a circular line concentric with the plug axis.

The radially inner edges of the cams 31 may be defined by a central socket 36 in the plug. The end shoulders of the cam surfaces 31 and the end walls of the recesses 34 lie in planes which lie on the axis of the plug.

The operating stem or element 30 is equipped with two concave, arcuate and V-shaped cam surfaces 38, each of which will normally lie directly opposite the respective plug cam surface 31. As shown in Figure 1, two diametrically opposite projections 39 are integral with the stem 30, these projections and an adjacent cam surface 38 being spaced 90° so that a projection 39 will extend into each recess 34 of the plug. Each projection 39 includes a shoulder at each end thereof and these shoulders lie in planes which lie on the axis of the stem. As is explained in the above-mentioned Bowan and Tratzik application, the projections 39 are of a length circumferentially of the plug which is less than the corresponding dimension of the recesses 34. In this way the projections 39 have a loose fit with respect to the recesses and circumferentially of the plug and operating element 30. A roller 40 is positioned between each pair of axially opposed cam surfaces 31 and 38, the rollers being tapered to conform to the surfaces of the cams and rounded at their outer ends so that they will have a single point bearing upon the inner cylindrical surface of a holding ring 41 which fits about the inner end of the operating stem or element 30. The rollers 40 are held in proper position radially of the cam surfaces by the ring 41 and, because the rollers are tapered, no other securing means is required to maintain them in position.

As shown in Figure 1, the operating stem 30 is of reduced diameter at its outer end to provide an outwardly facing shoulder thereon within the bore 23 of bossed plate 21, and a roller bearing assembly is positioned between this shoulder and a retainer sleeve 42. Retainer sleeve 42 is threaded in the bore 23 of the plate 21 and, at its outer end, is provided with flat lateral surfaces, not shown, adapted to be engaged by a suitable wrench. Stem 30 extends outwardly beyond the sleeve 42 and may be squared as indicated at 43 to receive an operating handle or wrench. Sleeve 42 serves to hold stem 30 against outward movement.

As best shown in Figure 3, the seating surface 14 of the valve casing member 10 is provided with four C-shaped grooves 46, 47, 48 and 49, respectively. The longitudinal extending portions of these grooves are spaced ninety degrees apart about the seating surface but the free ends of the circumferentially extending portions of each C-shaped groove are spaced from the longitudinal portion of the next adjacent C-shaped groove. It will be observed from Figure 3 that the grooves 46 and 48, respectively, enclose the inlet passage 12 and outlet passage 13, and that each passage is equidistantly spaced between the longitudinal portion of two grooves.

As best shown in Figure 2, the valve plug 25 has four short grooves 55 equidistantly spaced about its small end at a point between the small end of the plug and the flow port 26. These grooves are only of sufficient length circumferentially of the plug that they will bridge the corresponding ends of the C-shaped grooves when the plug is in either open or closed position. The large end of the plug 25 has four short arcuate grooves 56 equidistantly spaced thereabout at a point between the large end of the plug and the flow port 26. Two diametrically opposed short grooves 56 have ducts 57 extending therefrom to the large end of the plug and the chamber 16. This groove system seals both axial ends of the seating surfaces and also encloses ports 12, 13 and 26 in open or closed position of the plug.

As is shown in Figure 1, the larger end of the plug 25 is recessed and a cap 58 is threaded in the recess. A diaphragm or impulse member 59 is secured in the recess and an aperture 60 in cap 58 places the space or chamber 61 outwardly of the diaphragm in communication with the chamber 16 defined between the larger end of the plug and the plate 17. An axial port 62 extends from the diaphragm-carrying recess to the plug flow port 26 and the plug also includes a small radial bore 63 extending from its flow port to its seating surface. Bore 63 is so positioned with respect to the 90° path of rotation of the plug that when the plug is in closed position, as shown in Figure 1, bore 63 will extend to the inlet 12 of the valve. By these arrangements, the inner surface of diaphragm 59 will be subject to line pressure in either open or closed position of the plug.

In use, the lubricating groove system will be filled with grease by a pressure gun connected to a grease fitting chamber 65, the grease then moving through a radial passage 66 to the chamber 16. From the latter, the supply of grease will move through the aperture 60 to the chamber 61 and also through the passages 57 in the plug to the C-shaped grooves. Enough grease will be supplied through the grease fitting chamber 65 to entirely fill the groove system as well as the chambers 16 and 61 and thereby force diaphragm 59 to the distended position shown in Figure 1.

With the entire grease system filled with lubricant, line pressure acting through bore 62 will exert pressure upon diaphragm 59 and thereby upon the grease in chambers 61 and 16 to hold the plug firmly seated.

When the plug is to be operated, a suitable operating element will be fitted upon the outer end of the operating stem 30 to rotate the latter. As is described in the above-mentioned Bowan and Tratzik application, Ser. No. 611,465, the initial rotation of the stem 30 will cause the plug to move axially so that it will be slightly unseated. When the plug has been sufficiently unseated to overcome resistance to turning, it will then rotate with the stem 30, generally by engagement of the lugs 39 with the side walls of the recesses 34. When the plug is moved axially as has just been described, and with the line pressure acting upon the inner surface of the diaphragm, a high pressure will be exerted upon the lubricant in the chambers 61 and 16, thereby forcing additional lubricant from these chambers to the seating surfaces of the valve. This additional lubricant will enable the plug to be more readily rotated and will also increase the supply of lubricant on the seating surfaces to thereby maintain these surfaces properly sealed.

Movement of lubricant from the chambers 16 and 61 by the axial movement of the plug just described naturally will result in a loss of lubricant from chamber 61. This will be compensated for by the pressure on the inner surface of diaphragm 59. That is, when the plug again reaches an axial position such as approximated in Figure 1, the line pressure acting on the inner surface of diaphragm will force the latter outwardly (or downwardly as viewed in Figure 1) thereby maintaining the lubricant in the entire system under proper pressure. It eventually will be necessary to furnish additional lubricant to the chambers through the grease gun fitting supporting chamber 65. However, large valves used in high pressure lines are not operated at frequent intervals and a long period of time may pass before the supply of lubricant in the chambers is so reduced as to require replenishment.

In order to prevent leakage between the retainer sleeve 42 and the bossed plate 21, a packing ring 67 of the character described in the above-mentioned Bowan and Tratzik application is provided between these two surfaces. Leakage along the stem 30 is prevented by a packing ring 68 corresponding to that described in said application. As is also explained in the above-mentioned application, the ring 67 is of such character that the retainer sleeve 42 may be slightly backed out to permit some play between the cams 38 and the rollers 40 so that the valve plug may be fully seated, all without permitting leakage past packing 67.

The terminology used in the specification is for the purpose of description and not of limitation, the scope of the invention being defined in the claims.

I claim:

1. In a valve, a casing member provided with a flow passageway and a tapered seat bore, a tapered ported plug mounted in the seat bore, a lubricant chamber recessed within the larger end of plug and open to said larger end, an impulse member within the lubricant chamber, passages entirely within said plug through which flow line pressure will act upon the side of said impulse member which faces toward the small end of the plug, a second lubricant chamber open to the larger end of the seat bore, the second lubricant chamber having a radius at least as great as the greatest dimension of the seat bore, a lubricant groove system in the valve seating surface and in receiving relation to the second lubricant chamber, and means to move said plug axially into the second lubricant chamber during initial rotation of the plug to thereby force lubricant from the chambers and into the groove system.

2. A valve of the character defined in claim 1 wherein said impulse member is a diaphragm.

3. A valve of the character defined in claim 1 including means to supply lubricant to the second chamber from the interior of the casing member.

FREDERICK TRATZIK.

REFERENCES CITED

The following references are of record in the file of this patent:

UNITED STATES PATENTS

| Number | Name | Date |
|---|---|---|
| 2,065,726 | Nordstrom | Dec. 29, 1936 |
| 2,187,926 | Aikman | Jan. 23, 1940 |
| 2,321,233 | Mueller | June 8, 1943 |

FOREIGN PATENTS

| Number | Country | Date |
|---|---|---|
| 256,098 | Great Britain | Aug. 5, 1926 |
| 484,239 | Great Britain | May 3, 1938 |
| 494,261 | Germany | Mar. 20, 1930 |